United States Patent
Albert et al.

(10) Patent No.: US 8,770,601 B2
(45) Date of Patent: Jul. 8, 2014

(54) VEHICLE COMPRISING AT LEAST TWO AXLES, THE WHEELS OF WHICH ARE PARALLEL

(75) Inventors: Loic Albert, Clermont-Ferrand (FR); Fabien Marlier, Clermont-Ferrand (FR); Philippe Mansuy, Cebazat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/388,041

(22) PCT Filed: Jul. 6, 2010

(86) PCT No.: PCT/EP2010/059606
§ 371 (c)(1),
(2), (4) Date: Apr. 10, 2012

(87) PCT Pub. No.: WO2011/012408
PCT Pub. Date: Feb. 3, 2011

(65) Prior Publication Data
US 2012/0187645 A1  Jul. 26, 2012

(30) Foreign Application Priority Data
Jul. 29, 2009 (FR) ...................................... 09 55307

(51) Int. Cl.
*B62D 53/06* (2006.01)

(52) U.S. Cl.
USPC .................... 280/81.1; 280/405.1; 280/450

(58) Field of Classification Search
CPC ........................................................ B62D 53/068
USPC ................ 280/81.1, 407.1, 405.1, 86.5, 676; 152/535
See application file for complete search history.

(56) References Cited

U.S. PATENT DOCUMENTS

| 2,959,428 | A | * | 11/1960 | Felburn | 280/426 |
| 3,515,197 | A | | 6/1970 | Boileau | |
| 3,533,645 | A | * | 10/1970 | Newberry | 280/426 |
| 4,017,094 | A | * | 4/1977 | Pilcher | 280/404 |
| 5,201,836 | A | * | 4/1993 | DeWitt | 280/426 |

(Continued)

FOREIGN PATENT DOCUMENTS

| EP | 6865517 | 12/1995 |
| FR | 1473029 | 3/1998 |
| JP | 10071810 | 3/1998 |
| WO | WO 99/14065 | 3/1999 |

OTHER PUBLICATIONS

Truck/Trailer Tire Properties; Articulated Vehicle Option Discussion; http://www.mchenrysoftware.com/medit32/readme/msmac/trucktrailertireproperties.htm, 3 pages.*

(Continued)

*Primary Examiner* — Karen Beck
(74) *Attorney, Agent, or Firm* — Cozen O'Connor

(57) ABSTRACT

A vehicle (3) comprising at least two axles (6, 7, 8) fitted with at least two tires the axis of rotation of which are always mutually parallel from one axle to another. The tires of at least one axle (7) have a cornering stiffness greater than that of the tires of another axle (6, 8).

6 Claims, 3 Drawing Sheets

(56) References Cited

U.S. PATENT DOCUMENTS

| | | | | |
|---|---|---|---|---|
| 5,305,844 A * | 4/1994 | Ducote | 180/24.01 |
| 5,323,824 A * | 6/1994 | Swift et al. | 152/209.8 |
| 5,327,989 A * | 7/1994 | Furuhashi et al. | 180/248 |
| 5,392,872 A * | 2/1995 | Ducote | 180/24.01 |
| 5,622,575 A * | 4/1997 | Meyer-Adlung et al. | 152/209.5 |
| 7,154,385 B2 * | 12/2006 | Lee et al. | 340/431 |
| 7,219,913 B2 * | 5/2007 | Atley | 280/426 |
| 7,445,070 B1 * | 11/2008 | Pickering | 180/211 |
| 7,561,953 B2 * | 7/2009 | Yu | 701/78 |
| 7,775,533 B2 * | 8/2010 | Strong | 280/86.5 |
| 8,256,555 B2 * | 9/2012 | Ackley | 180/210 |
| 2004/0035625 A1 * | 2/2004 | Talbot et al. | 180/210 |
| 2004/0102894 A1 * | 5/2004 | Holler | 701/124 |
| 2005/0035583 A1 * | 2/2005 | Hinton | 280/755 |
| 2006/0108159 A1 * | 5/2006 | Jansson et al. | 180/21 |
| 2006/0187008 A1 * | 8/2006 | Yu | 340/431 |
| 2006/0206253 A1 * | 9/2006 | Yu | 701/70 |
| 2006/0235589 A1 * | 10/2006 | Deng et al. | 701/41 |
| 2007/0000715 A1 * | 1/2007 | Denney | 180/311 |
| 2010/0201092 A1 * | 8/2010 | Pompa et al. | 280/86.5 |
| 2011/0042154 A1 * | 2/2011 | Bartel | 180/11 |
| 2012/0126507 A1 * | 5/2012 | Wayman | 280/281.1 |
| 2012/0187645 A1 * | 7/2012 | Albert et al. | 280/81.1 |
| 2013/0049316 A1 * | 2/2013 | Schwinn et al. | 280/86.5 |

OTHER PUBLICATIONS

Obara, M. JP 100710810, Mar. 17, 1998, English Machine Translation.*

* cited by examiner

VEHICLE COMPRISING AT LEAST TWO AXLES, THE WHEELS OF WHICH ARE PARALLEL

RELATED APPLICATIONS

This is a U.S. National Phase Application under 35 USC 371 of International Application PCT/EP2010/059606, filed on Jul. 6, 2010.

This application claims the priority of French patent application no. 09/55307, filed Jul. 29, 2009, the entire content of which is hereby incorporated by reference.

FIELD OF THE INVENTION

The invention relates to a vehicle such as a transport vehicle of the heavy goods type, comprising at least two axles, none of them being a steered axle, and to a method of distributing the load of said vehicle.

Although not limited to this type of application, the invention will be more particularly described with reference to a vehicle of the trailer or semi-trailer type comprising three axles, each fitted with at least two tires.

BACKGROUND OF THE INVENTION

The circumferential direction of the tire, or longitudinal direction, is the direction corresponding to the periphery of the tire and defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it revolves in normal use.

A radial or meridian plane is a plane containing the axis of rotation of the tire.

A circumferential plane is a plane perpendicular to the axis of rotation of the tire.

The circumferential median plane, or equatorial plane, is a plane perpendicular to the axis of rotation of the tire and which splits the tire into two halves.

Such vehicles, generally intended to carry heavy loads, need to meet certain requirements regarding in particular the longitudinal spacing between each of the axles. Specifically, the various sets of regulations dictate longitudinal distances between two axles of a trailer that has three axles, according to the permissible load for said vehicle. This is usually a distance of 1.3 meters for trailers comprising three axles. Moreover, current market trends for these trailers is towards a standardization of the design of these trailers and particularly towards equipping them with a given and the same tire for all of the axles.

The way in which such three-axle trailers are used has an effect notably on tire wear. Specifically, when the vehicle follows a straight-line path, for example on a road or a motorway, all of the tires with which the trailer is fitted experience substantially equivalent conditions. However, as soon as the trailer follows a curved path, such as on a roundabout for example or during maneuvering, the tires are no longer loaded in the same way. These differences in load generate highly variable levels of wear on the various tires with which the trailer is fitted, making tire management in particular complicated. It also entails the provision of tires that can meet the most severe tire wear conditions and therefore tires that have a sufficient depth of tread. This of course makes the design of the tire more complicated, because the mass of rubber is not favorable to tire durability because it leads to increases in tire temperature during running.

First of all, notably as a function of speed, running along a curved path leads to load being transferred onto the tires that are on the outside of the bend, and therefore to greater wear thereof.

Secondly, some of the tires fitted to the three axles experience phenomena of scrubbing against the ground, which accentuates the wearing of the tires affected by these phenomena. Indeed it is known that when the vehicle is fitted with three axles, each fitted with at least two tires, not all of the tires are able to follow a curved path corresponding to the path followed by the vehicle. When the spacing between the axles is even, if the tires fitted to the intermediate axle follow a path substantially equivalent to that of the vehicle, the tires fitted to the other two axles experience phenomena of scrubbing against the ground, leading to greater tire wear.

It is clear from this usage that the tire wear of tires fitted to such a vehicle is uneven, and dependent on whereabouts on the trailer the tire is fitted, even though the tires are usually all the same.

Further, changes to road layouts, notably with a view to improving the safety of road users, has led to a proliferation of roundabouts and therefore to a not-insignificant increase in the causes that lead to differential tire wear across the tires with which a trailer is fitted.

The current state of affairs means that uneven tire wear on a trailer comprising three axles is becoming troublesome to the user who too often has to lay up his vehicle to remedy this, either by swapping the tires around or by changing them.

Document FR 2 903 953 or even document EP 1 640 247 propose solutions consisting in self-steering axles which work by passive or even active steering of the axles of a trailer. While these technologies provide solutions to the scrubbing problem or to the problem of differential tire wear, they are, on the other hand, difficult and expensive to implement. Further, because of their complexities, these technologies are operational only during maneuvering.

There are also available on the market such trailers in which one or more axles can be raised up to eliminate contact between the tires with which these axles are fitted and the ground. These raisable axles of course avoid tire wear for the tires concerned when they are in the raised position, but this status can be maintained only as long as the load being carried is below the maximum possible load.

SUMMARY OF THE INVENTION

One object of the invention is to improve the tire wear of a vehicle comprising at least two axles, none of them being a steered axle, and more specifically of reducing the uneven rate of wear between the various tires, notably when driving along a curved path or during maneuvering.

The objective has been achieved according to one aspect of the invention by a vehicle comprising at least two axles fitted with at least two tires the axis of rotation of which are always mutually parallel from one axle to another, the tires of at least one axle having a cornering stiffness greater than that of the tires of another axle.

Advantageously according to an embodiment of the invention, the at least two axles are not driven axles.

According to an embodiment of the invention, the cornering stiffnesses of the tires are defined as being the gradient, on the plot of a curve expressing the force applied by the tire to the ground as a function of the cornering angle, measured for a pressure of 9 bar with loads varying from 0.6 LI (Load Index) to 1.5 LI applied to the tire.

The inventors have been able to demonstrate, notably in the case of trailers comprising three axles, that the presence of tires with cornering stiffnesses greater than those of the tires with which the other axles are fitted makes it possible to limit tire wear when negotiating roundabouts or during maneuvering. More specifically, the tire wear of the tires fitted to the front and rear axles is reduced.

Tests carried out on a route combining main road, urban and parking-area driving to simulate average standard use have demonstrated that a vehicle according to the invention is able to achieve a more even wear rate across all the tires of the vehicle as compared with the wear rate of tires fitted to a similar vehicle in which the cornering stiffness is the same for all the tires of all the axles.

According to a preferred embodiment of the invention, with the said vehicle comprising three axles, the cornering stiffness of the tires fitted to the intermediate axle is greater than those of the tires fitted to the other axles, in order best to limit the phenomena of scrubbing of the tires fitted to the other axles.

For preference also, the cornering stiffness of the tires fitted to the intermediate axle is at least 10% greater than those of the tires fitted to the other axles.

According to a first alternative form of the invention, with the said vehicle comprising three axles, the cornering stiffness of the tires fitted to at least two of the axles are the same.

According to other alternative forms of embodiment of the invention, with the said vehicle comprising three axles, the cornering stiffness of the tires fitted to each axle is different. According to this type of alternative form of embodiment, the choice of tires will be made as a function of the various vehicle parameters such as size, spacing between axles, load to be transported, etc.

One embodiment of the invention that makes it possible to obtain tires with different cornering stiffness from one axle to another is to keep the dimensions of the tires the same across all the axles, the tires of the said at least one axle having a cornering stiffness greater than that of the tires of another axle having a different architecture. For example, the tires may have working plies in which the angles formed by the reinforcing elements with the circumferential direction are smaller than those of the working plies of the tires fitted to the other axles.

In the context of the invention, the working plies are plies of reinforcing elements that make an angle with the circumferential direction, the reinforcing elements being crossed from one ply to the next.

According to another embodiment of the invention, at least one axle comprises tires that have a tread strip width greater than those of the tires of at least one other axle, so that the cornering stiffness of the tires is greater than those of the other tires.

According to another embodiment of the invention, at least one axle comprises more tires than at least one other axle. The tires fitted to all the axles are then advantageously identical and all the tires of the said at least one axle that comprises more tires have a cornering stiffness greater than that of the tires of the other axles. In the case of a vehicle comprising three axles, the intermediate axle may for example comprise two pairs of twinned wheels, the other axles each comprising two individual wheels, the tires being the same on all the wheels.

According to other embodiments of the invention, at least one other axle comprises tires of geometric dimensions that are different from those of the tires of at least one other axle, notably associated with wheel rims of diameters smaller than that of the rims of at least one other axle.

According to any one of these embodiments and notably when the tires of the said at least one axle having a cornering stiffness greater than that of the tires of another axle have a tread strip of greater width or alternatively, when the said at least one axle comprises more tires than the others, each axle bears at least 10% of the load of the vehicle and, during running, the said at least one axle the tires of which have a cornering stiffness greater than that of the tires of another axle bears a different load from the loads borne by the other axles.

According to one preferred embodiment of the invention, at least one axle the tires of which have a cornering stiffness greater than that of the tires of another axle carries a load at least 15% greater than the load carried by another axle.

The inventors have been able to demonstrate, notably in the case of trailers comprising three axles, that a different distribution of load across the axles can contribute to evening out the rate of tire wear when negotiating roundabouts or during maneuvering. More specifically, the rate of wear of the tires with which the front and rear axles are fitted is reduced.

Vehicles, and, notably, trailers comprising three axles, are nowadays increasingly being fitted with suspension of the air suspension type. At the present time, the suspension air springs are all at the same pressure. A modification to the air spring pressure management device, which is within the competence of the person skilled in the art, for example using electrically operated valves, may allow the air springs to be given pressures that differ from one another and therefore differ from one axle to another. Such a modification to the pressure of the suspension air springs allows a different load distribution between at least two axles to be achieved.

According to another embodiment of the invention, the pressure in the various suspension air springs can be managed immediately after the vehicle has been loaded and the setting maintained throughout the driving of this vehicle. This embodiment is most particularly suited to the case of vehicles that run around carrying loads lower than their maximum load capacity. This is because the loss in terms of the behavior of the tires fitted to the axles the load of which has been lightened has no impact in as much as the vehicle is loaded to below its maximum load capacity.

The inventors have also demonstrated that in most cases the vehicles are not used at their maximum load and that accordingly this first embodiment is satisfactory in very many cases.

As already stated, this embodiment is particularly well suited to the case of vehicles comprising an axle with more wheels and able to carry a greater load or alternatively also to the case of an axle comprising tires with a tread strip of greater width, also generally capable of carrying a heavier load.

According to another embodiment of the invention, this management of the pressure in the suspension air springs is done in real time so as not to penalize straight-line running and to introduce loads that differ between at least two axles only under cornering corresponding to roundabouts or maneuvering phases.

In order to carry out such real-time pressure management, it is possible to provide a manual control operated by the driver which will allow a transition from a status in which the pressures in all the suspension air springs are identical, the said status being suited to driving along a main road or motorway, to another status in which the pressures in at least two suspension air springs are different.

Another way of effecting this real-time management may be to use a microprocessor on the basis of data measured on the vehicle. For example, it is possible to use data accessible in the antilock braking systems associated with each of the wheel. Specifically, these systems provide precise data regarding the rotational speeds of each of the wheels and from this it is therefore possible to deduce firstly the speed of the vehicle, by averaging the various speeds and secondly, the turn radius followed, if there is one, by determining the differences between the speeds of the wheels of one and the same axle.

It is also possible to achieve different load distributions between at least two axles by providing suspension air springs of different sizes on at least one axle. In such embodiments, the different load distributions are maintained throughout driving.

According to an alternative form of embodiment of the invention, with the said vehicle comprising three axles, at least two axles bear identical loads. Advantageously according to the invention, the load borne by the intermediate axle is different from that of the other axles in order best to limit the phenomena of tire scrub for the tires fitted to the other axles.

According to other alternative forms of embodiment of the invention, with the said vehicle comprising three axles, each axle bears a different load. According to this type of alternative form of embodiment, the choice of distribution will be made as a function of the various parameters of the vehicle, such as the size, the spacing between the axles, the load being transported, etc.

According to either one of these alternative forms of embodiment of the invention, when the cornering stiffness of the tires with which the intermediate axle is fitted is greater than those of the tires with which the other axles are fitted, the load borne by the intermediate axle is advantageously greater than those of the other axles. The intermediate axle advantageously bears a load that is greater than the loads borne by the other two axles so as best to limit the phenomena of tire scrub for the tires fitted to these two front and rear axles either when negotiating roundabouts or during maneuvering.

According to a preferred embodiment of the invention, the load borne by the intermediate axle is comprised between 35 and 70% of the load of the vehicle.

For preference also, the load borne by the front axle and/or the rear axle is comprised between 10 and 33% of the load of the vehicle.

Lightening the load borne by the tires of the front axle also makes it possible to limit the extent to which these tires are damaged in impacts, for example, with curbs. Specifically, it is the tires of the front axle that potentially come into contact with said curbs when maneuvering and negotiating roundabouts.

The inventors have also been able to demonstrate that the vehicle according to the invention can be operated without altering the load-bearing capacities of the tires customarily used.

Specifically, at the present time, the tires mainly used on trailers comprising three axles are of the 385/65R22.5 type. Such tires have a load bearing capability of 4.5 tonnes, in accordance with the definitions laid down by the ETRTO. Moreover, certain legislation regarding trailers has for example set a maximum trailer load at 24 tonnes. From these figures it is clear than even when the trailer is at maximum load, the six tires fitted to the three axles still have additional capacity with regard to the load being transported. Indeed in theory, these six tires could support a load of 27 tonnes.

It is therefore possible, in such cases, to apply different loads to such a trailer fitted with these tires by, for example, having each of the tires of the intermediate axle bear a load of 4.5 tonnes and each of the other tires bear a load of 3.75 tonnes.

Such a differential distribution of load between the axles works all the better when the vehicles are running with loads below the maximum possible loads.

When the invention is applied to vehicles each of the axles of which is fitted with braking devices with antilock braking systems on each axle, braking can be performed effectively.

There are still vehicles that have just one antilock braking system operating all of the braking devices of the various axles. With this type of vehicle, it is necessary to slave the actions connected with the antilock braking system to suit the load being carried by each of the axles. For example, it is within the competence of a person skilled in the art to connect these actions to the pressure of the suspension air springs.

DETAILED DESCRIPTION OF THE DRAWINGS

To make them easier to understand, the figures are not drawn to scale.

Figure 1:
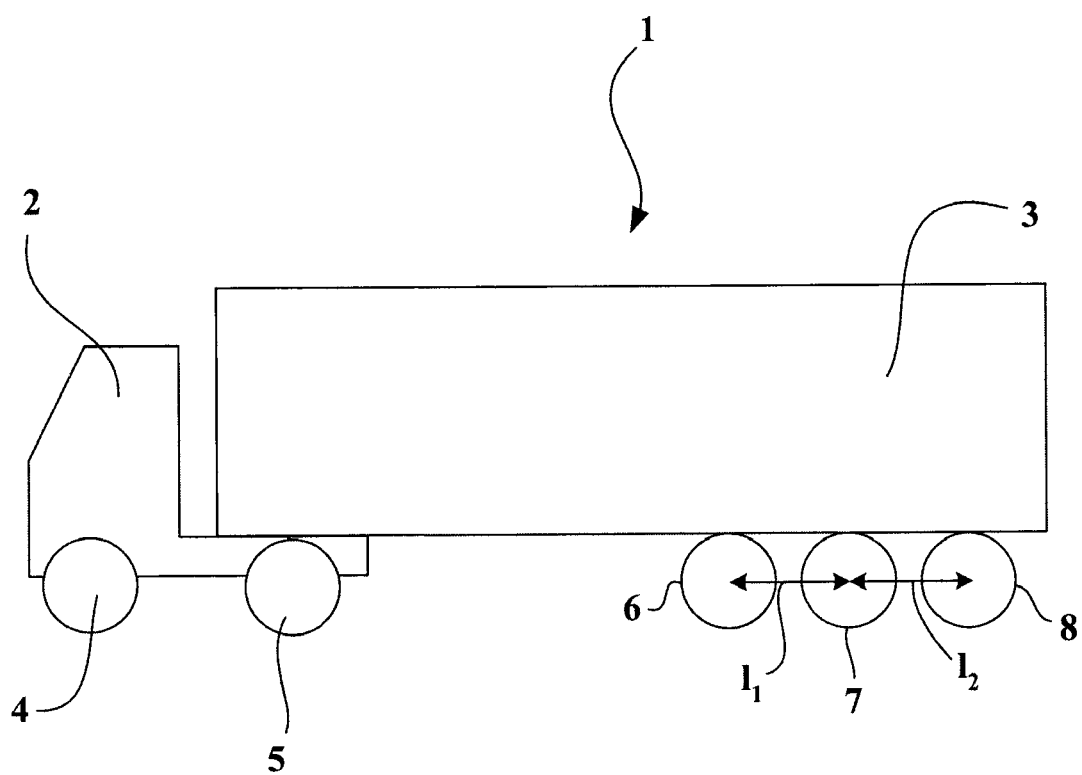
FIG. 1 is a diagram of a vehicle comprising a trailer with three axles.

FIG. 1 schematically depicts a vehicle 1 consisting of a tractor 2 and of a trailer 3.

The tractor 2 comprises a steered first axle 4 and a driven second axle 5. The trailer 3 comprises three bearing axles 6, 7, 8. These three axles 6, 7, 8 are neither steered nor driven. The spacings or wheel bases 11 and 12 between the three axles 6, 7, 8 are equal to 1.3 meters.

The overall laden weight of the vehicle 1 is equal to a maximum of 40 tonnes, which corresponds to a maximum transported load of 24 tonnes.

The distribution of weight across the various axles when the vehicle 1 is at its maximum load, this load being distributed evenly across the trailer 3 is as follows:

axle 4: 6.6 tonnes
axle 5: 11.8 tonnes
axles 6, 7 and 8: 21.6 tonnes

According to the invention, the tires of the intermediate axle 7 have a cornering stiffness that is greater than those of the tires fitted to the axles 6 and 8. As stated previously, this greater cornering stiffness can be obtained by a different architecture, notably by a different crown architecture, the exterior dimensions of the tires remaining the same.

Figure 2:
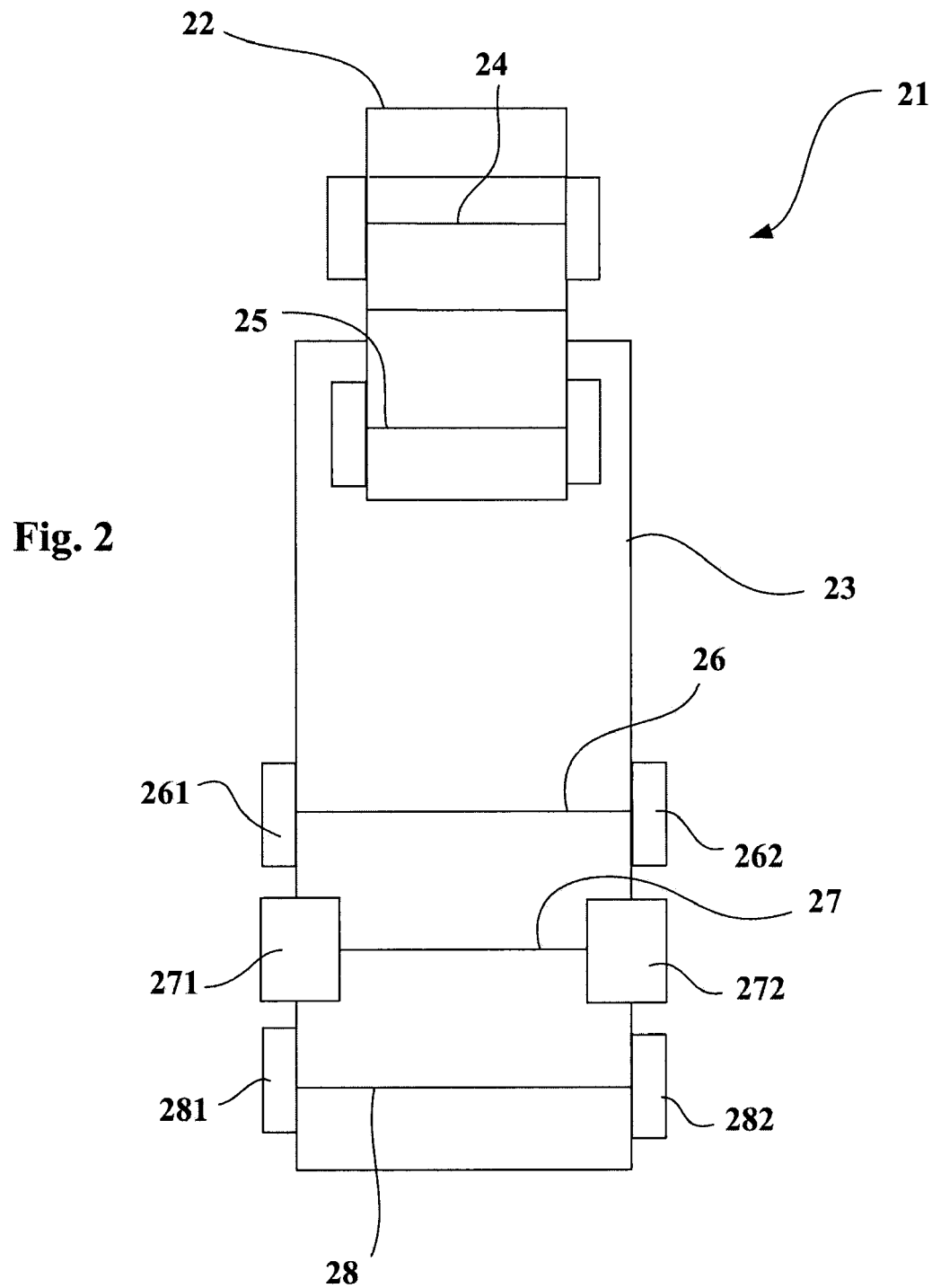
FIG. 2 is a schematic depiction from above of a vehicle according to a first embodiment of the invention.

FIG. 2 schematically illustrates an alternative form of embodiment of the invention, in which the vehicle 21 is viewed from above with some hidden details shown in order to be able to see all the tires and axles of the tractor 22 and of the trailer 23. According to this alternative form of embodiment of the invention, all of the tires 261, 262, 281, 282 with which the axles 26 and 28 of the trailer 23 are fitted are identical and of the 385/65R22.5 type. The intermediate axle 27 has tires 271, 272 which have a far wider tread strip and which are of the 495/45R22.5 type. These tires 271, 272 with the wider tread strip give the tires of the intermediate axle 27 a cornering stiffness that is greater than those of the tires 261, 262, 281, 282 of the other two axles 26 and 28.

Figure 3:
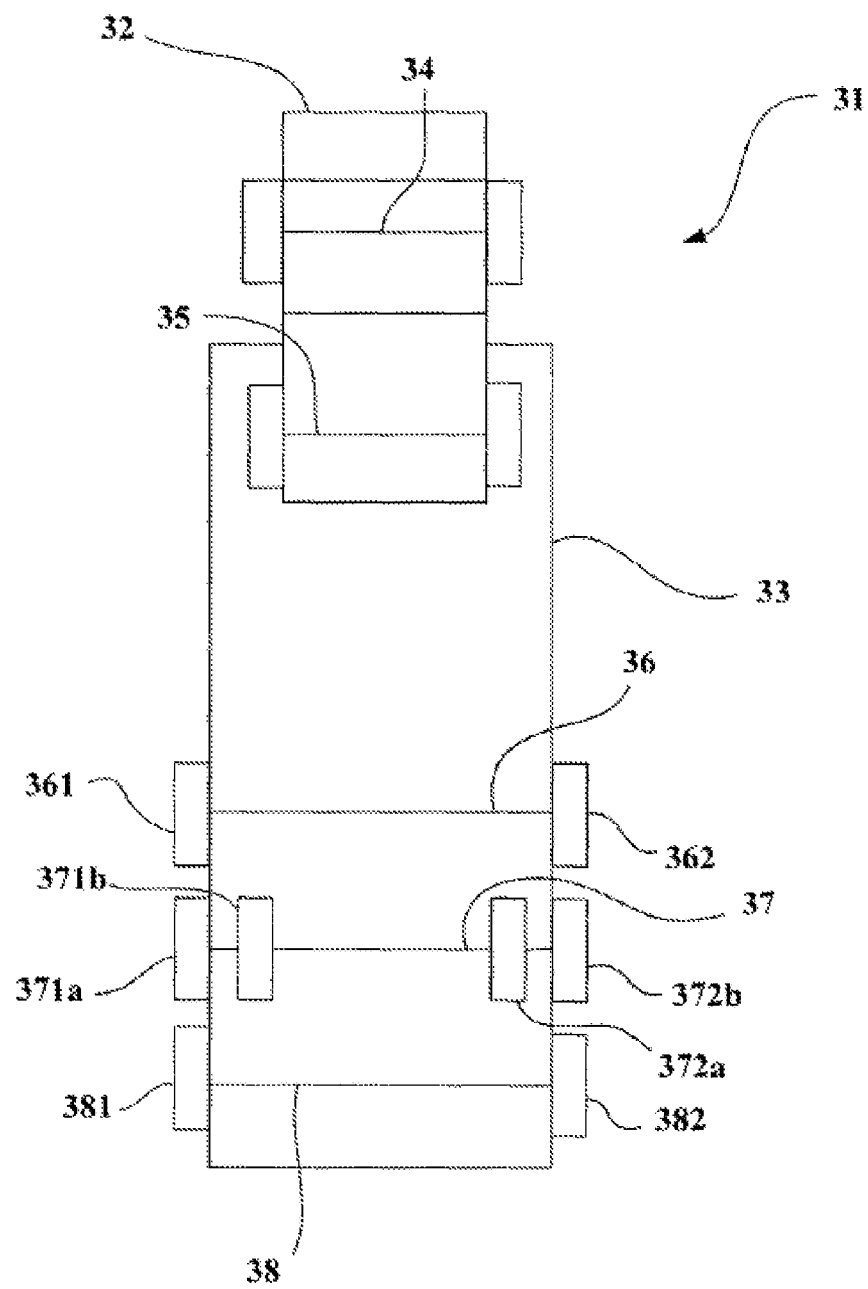
FIG. 3 is a schematic depiction from above of a vehicle according to a second embodiment of the invention.

FIG. 3 schematically illustrates an alternative form of embodiment of the invention, in which the vehicle 31 is viewed from above with some hidden details shown in order to be able to see all the tires and axles of the tractor 32 and of the trailer 33. According to this alternative form of embodiment of the invention, all of the tires with which the axles 36, 37, 38 of the trailer 33 of the vehicle 31 are identical and the intermediate axle 37 comprises two pairs of twin wheels. These twin wheels thus give each of the pairs of tires 371a/371b and 372a/372b of the intermediate axle 37 a cornering stiffness that is greater than that of each of the tires 361, 362, 381, 382 of the other two axles 36 and 38.

According to these two alternative forms illustrated in FIGS. 2 and 3, the load carrying capacity of the intermediate axle 27, 37 is in fact greater than the load carrying capacity of the other two axles 26, 28; 36, 38 of the trailer 23, 33. It is thus possible to combine different cornering stiffnesses per axle with carried loads that also differ per axle, notably a higher load carried by the intermediate axle 27, 37.

In order to obtain different loads on the axles, as explained previously, is it possible to plan for each of the axles 26, 27, 28; 36, 37, 38 to be associated with a suspension, not depicted in the figure, of the air suspension type, the pressure of the air spring of which can be adjusted for each of the axles.

The vehicle 21, 31 is also equipped with a system that allows the pressure of each of the suspension air springs to be modified. This regulation of the pressures is, for example, achieved using electrically operated valves associated with each of the air circuits of the various axles 26, 27, 28; 36, 37, 38.

The greater load on the axle 27, 37 also contributes to limiting tire wear on the axles 26, 36, and 28, 38 when these are caused to scrub against the ground when the vehicle 21, 31 is negotiating roundabouts or during maneuvering.

Tests have thus been carried out with the vehicle 1, this vehicle transporting a load of 24 tonnes, with 21.6 tonnes being borne by the three axles of the trailer, as explained before.

The tests were carried out firstly with a reference vehicle comprising tires that were identical on all of the axles of the trailer and secondly with vehicles according to the invention, in which the tires fitted to the intermediate axle had cornering stiffnesses greater than those of the other tires of the other two axles because of a different crown architecture. Various tires were designed in order to assess the influence of the differences in cornering stiffness between the various tires. The tests were thus carried out firstly with tires fitted to the intermediate axle with a cornering stiffness greater than 1.2 times that of the tires of the other two axles (Test A) and secondly with tires fitted to the intermediate axle having a cornering stiffness greater than 1.5 times that of the tires of the other two axles (Test B), the overall cornering stiffness of the set of tires of the three axles being identical to that of the tires of the reference vehicle. In all cases, the nature of the materials of which the tread strips were made was the same.

First tests, simulating tire wear due to driving in urban environments comprising roundabouts, were carried out on a track that imposed turn radii ranging from 30 to 240 meters, with a standard deviation of curvature of 0.0087 $m^{-1}$, at speeds ranging from 20 to 50 km/h, such that the standard deviation on transverse acceleration was 0.47 $m/s^2$.

The test involved driving the vehicle for 250 hours and characterizing the absolute tire wear by measuring the lost tire material in grams per 100 km for each of the tires fitted to the three axles of the trailer and by averaging these tire wears across the two tires fitted to one and the same axle.

The results are recorded in the table below and expressed in grams per 100 km:

|  |  | Axle 1 | Axle 2 | Axle 3 |
|---|---|---|---|---|
| Reference vehicle (g/100 km) | | 12.4 | 2.95 | 43.7 |
| Vehicle according to the invention | Test A (g/100 km) | 11.2 | 3.50 | 41.0 |
|  | Test B (g/100 km) | 9.8 | 4.25 | 37.4 |

Second tests, simulating tire wear due to driving also including maneuvering, were carried out on a track imposing turn radii ranging from 16 to 240 meters, with a standard deviation on curvature of 0.0097 $m^{-1}$, at speeds ranging from 5 to 50 km/h, such that the standard deviation on transverse acceleration was 0.47 $m/s^2$.

The test involved driving the vehicle for 250 hours and characterizing the absolute tire wear by measuring the lost tire material in grams per 100 km for each of the tires fitted to the three axles of the trailer and by averaging these tire wears across the two tires fitted to one and the same axle.

The results are recorded in the table below and expressed in grams per 100 km:

|  |  | Axle 1 | Axle 2 | Axle 3 |
|---|---|---|---|---|
| Reference vehicle (g/100 km) | | 20.9 | 2.97 | 49.2 |
| Vehicle according to the invention | Test A (g/100 km) | 19.2 | 3.49 | 46.3 |
|  | Test B (g/100 km) | 17.0 | 4.22 | 42.5 |

In both instances the results obtained show that the vehicle according to the invention makes it possible to reduce tire wear on the tires fitted to the front and rear axles of the trailer. The second test demonstrates that tire wear due to scrubbing during maneuvering is also improved.

A third type of test involved running two identical vehicles, one of them being a vehicle according to vehicle 1 according to the invention, on identical routes representative of a conventional type of use for lorries carrying goods. The test involved determining the life of the tires on each of the axles, this tire life being expressed in the number of kilometers covered before the tire became completely worn (as indicated by the wear indicators).

The results are recorded in the table below:

|  |  | Axle 1 | Axle 2 | Axle 3 |
|---|---|---|---|---|
| Reference vehicle | | 267000 km | 455000 km | 92000 km |
| Vehicle according to the invention | Test A | 283000 km | 392000 km | 99000 km |
|  | Test B | 309000 km | 331000 km | 109000 km |

While it might appear that improvements are obtained only on the two axles 1 and 3 which are subjected to the scrubbing phenomenon, the not-as-good performance of the tires fitted to axle 2 is of lesser importance in the light of the distances covered by these tires. Further, common practice is for the tires of this axle to be swapped around, fitting them to the other axles in order to even out tire wear.

Final tests were carried out by combining different cornering stiffnesses with different axle loads.

The same tests as before were repeated using firstly the same reference vehicle and secondly the vehicle according to the invention fitted with tires according to Tests A and B, which vehicle was further modified to have different axle loads on the different axles. To do that, the air pressures in each of the suspension air springs of the trailer were adjusted so that the axle 7 bore a load of 9 tonnes and axles 6 and 8 each bore a load of 6.3 tonnes.

The results are recorded in the tables below; the first table corresponds to the tests for simulating tire wear due to urban driving, the second table corresponds to the tests simulating tire wear due to driving that also included maneuvering, and the third table corresponds to the tests for determining the life of the tires on each of the axles.

|  | Axle 1 | Axle 2 | Axle 3 |
|---|---|---|---|
| Reference vehicle (g/100 km) | 12.4 | 2.95 | 43.7 |
| Vehicle according to the invention Test A (g/100 km) | 9.5 | 4.31 | 37.3 |
| Test B (g/100 km) | 8.3 | 5.00 | 33.6 |

|  | Axle 1 | Axle 2 | Axle 3 |
|---|---|---|---|
| Reference vehicle (g/100 km) | 20.9 | 2.97 | 49.2 |
| Vehicle according to the invention Test A (g/100 km) | 16.2 | 4.27 | 42.2 |
| Test B (g/100 km) | 14.5 | 4.95 | 38.3 |

|  | Axle 1 | Axle 2 | Axle 3 |
|---|---|---|---|
| Reference vehicle | 267000 km | 455000 km | 92000 km |
| Vehicle according to the invention Test A | 330000 km | 325000 km | 112000 km |
| Test B | 365000 km | 288000 km | 126000 km |

These results demonstrate the beneficial effect of combining an axle fitted with tires that have a cornering stiffness greater than the cornering stiffness of the tires of the other axles with an axle load borne by said axle greater than the load borne by the other axles.

Test A demonstrates that it has been possible for the tires of axles 1 and 2 to be able to cover identical distances, thus limiting the need as described earlier to swap the tires around on this type of vehicle.

Combining the invention with a different choice of material from which to make the tread strip of the tires of axle 3 could make it possible to even out the distances covered by all three axles. Such a change of material is entirely conceivable given that it relates only to axle 3 and carries no risk of disrupting the behavior of the vehicle during driving.

The invention has essentially been described with reference to trailers comprising three axles forming part of five-axle vehicles. The invention also makes it possible to reduce tire wear on trailers with two axles, forming part of three-axle or five-axle vehicles or alternatively of trailers with two or three axles associated with vehicles of up to eight axles for weights ranging up to as much as 60 tonnes.

The invention also applies to vehicles which, on the same axles, combine a distribution of load per axle according to the invention with axles that could potentially be raised when no load is being transported.

The invention claimed is:

1. A vehicle comprising:
   a first and a second axle, each being fitted with at least two tires and having an axis of rotation which is always mutually parallel from one of the first and second axles to another; and
   at least one intermediate axle fitted with at least two tires and having an axis of rotation which is always mutually parallel with that of the first and second axles,
   wherein a set of all tires of the intermediate axle has a cornering stiffness greater than that of a set of all tires of each of the first and second axles, and
   wherein at least one axle comprises tires that have a tread strip width greater than those of the tires of at least one other axle.

2. The vehicle according to claim 1, wherein the cornering stiffness of the set of all tires fitted to the intermediate axle is at least 10% greater than the set of all tires fitted to each of the first and second axles.

3. The vehicle according to claim 1, wherein the cornering stiffness of the set of all tires fitted to each of the first and second axles is the same.

4. The vehicle according to claim 1, wherein the cornering stiffness of the set of all tires fitted to each of the first and second axles is different.

5. The vehicle according to claim 1, wherein each axle bears at least 10% of the load of the vehicle and wherein, during running, said intermediate axle bears a different load from the loads borne by each of the first and second axles.

6. The vehicle according to claim 5, wherein, during running, said intermediate axle bears a load at least 15% greater than the load borne by another axle.

\* \* \* \* \*